US012223457B2

(12) United States Patent
Paul et al.

(10) Patent No.: US 12,223,457 B2
(45) Date of Patent: Feb. 11, 2025

(54) INTELLIGENT SCORING SYSTEMS AND METHODS FOR SCORING A LEVEL OF PERFORMANCE OF A BUSINESS UNIT OF A PLURALITY OF BUSINESS UNITS IN AN ORGANIZATION

(71) Applicant: ALLSTATE SOLUTIONS PRIVATE LIMITED, Bangalore (IN)

(72) Inventors: Sarish Paul, Bangalore (IN); Anupam Adhikari, Bangalore (IN); Siddharth Gaur, Bangaluru (IN); Sheeba Bano, Hadapsar (IN); Kamalnath KV, Bangalore (IN)

(73) Assignee: ALLSTATE SOLUTIONS PRIVATE LIMITED, Bangalore (IN)

( * ) Notice: Subject to any disclaimer, the term of this patent is extended or adjusted under 35 U.S.C. 154(b) by 0 days.

(21) Appl. No.: 17/526,749

(22) Filed: Nov. 15, 2021

(65) Prior Publication Data

US 2023/0153739 A1 May 18, 2023

(51) Int. Cl.
 *G06Q 10/0637* (2023.01)
 *G06Q 10/0639* (2023.01)
(52) U.S. Cl.
 CPC ... *G06Q 10/06395* (2013.01); *G06Q 10/0637* (2013.01); *G06Q 10/06393* (2013.01)
(58) Field of Classification Search
 CPC .................................................. G06Q 10/0637
 See application file for complete search history.

(56) References Cited

U.S. PATENT DOCUMENTS 6,850,892 B1  2/2005 Shaw
8,214,238 B1 * 7/2012 Fairfield ............ G06Q 30/0203
                                                                    705/7.29

(Continued)

FOREIGN PATENT DOCUMENTS

CN   108701293 A   10/2018
CN   109716444 A    5/2019

(Continued)

OTHER PUBLICATIONS

J. Efrim Boritz, Duane B. Kennedy, "Effectiveness of neural network types for prediction of business failure," Expert Systems with Applications, vol. 9, Issue 4, 1995, pp. 503-512 (Year: 1995).*

(Continued)

*Primary Examiner* — Amanda Gurski
(74) *Attorney, Agent, or Firm* — Dinsmore & Shohl LLP

(57) ABSTRACT

An intelligent scoring system includes a scorecard tool, a user input device, a memory component, a processor; and machine-readable instructions. The scorecard tool includes a scorecard and a neural network model. The machine-readable instructions stored in the memory component cause the intelligent scoring system to: receive a parameter rating for the scorecard for a first portion of a plurality of business performance parameters; automatically input the parameter rating for the scorecard for a second portion of the plurality of business performance parameters; associate a weighting with each parameter rating; estimate a parameter outcome score for each of the first portion and the second portion of the plurality of business performance parameters based on each parameter rating and weighting; automatically estimate an overall outcome score; and automatically generate a recommendation for improving the level of performance of the business unit.

16 Claims, 7 Drawing Sheets

(56) References Cited

U.S. PATENT DOCUMENTS

| | | | | |
|---|---|---|---|---|
| 2006/0004555 A1* | 1/2006 | Jones | ............ | G09B 19/00 |
| | | | | 434/262 |
| 2014/0207531 A1 | 7/2014 | Kay | | |
| 2015/0294255 A1* | 10/2015 | Hussaini | ......... | G06Q 10/06393 |
| | | | | 705/7.39 |
| 2019/0303433 A1* | 10/2019 | Brenne | ........... | G06F 16/287 |
| 2020/0234218 A1 | 7/2020 | Salloum | | |
| 2020/0356865 A1 | 11/2020 | D'Auria | | |
| 2023/0086361 A1* | 3/2023 | Wan | ............ | G06F 11/1433 |
| | | | | 702/186 |

FOREIGN PATENT DOCUMENTS

| | | | | |
|---|---|---|---|---|
| CN | 111401828 A | 7/2020 | | |
| EP | 2889822 A1 * | 7/2015 | ....... | G06F 17/30598 |
| IN | 201731045513 A | 6/2019 | | |
| KR | 102124846 B1 | 6/2020 | | |
| WO | WO-2020160252 A1 * | 8/2020 | ........... | G06N 3/0454 |

OTHER PUBLICATIONS

An algorithm may decide your next pay raise (https://fortune.com/2019/07/14/artificial-intelligence-workplace-ibm-annual-review/), dated Jul. 12, 2020, 6 pages.

International Search Report and Written Opinion, PCT Application No. US2022/049855, dated Feb. 27, 2023, 14 pages.

* cited by examiner

| | | BUSINESS/DELIVERY UNIT GLOBAL CAPABILITY ASSESSMENT MODEL | |
|---|---|---|---|
| | | BUSINESS / DELIVERY UNIT NAME | |
| | 402 | ASSESSMENT DATE | |
| Max Possible Score | 188 | 404 | GC Subtotal |
| PARAMETERS | DESCRIPTION | RATING DESCRIPTION | |
| GLOBAL CAPABILITY/EXECUTION CAPABILITY | | | |
| Business Performance Parameter 1 | 400a Description of Business Performance Parameter 1 | Rating Description of Business Performance Parameter 1 | |
| Business Performance Parameter 2 | 400b Description of Business Performance Parameter 2 | Rating Description of Business Performance Parameter 2 | |
| Nth Business Performance Parameter | 400c Description of Nth Business Performance Parameter | Rating Description of Nth Business Performance Parameter | |
| Max Possible Score | 188 | GC SubTotal | |

FIG. 4

| 406 | 408 | | 414 | 418 | | | 20 |
|---|---|---|---|---|---|---|---|
| | CTS | | | | | OUTCOME | |
| 58 | EC Sub_T | 44.75 | | Total | 102.75 | 55 | |
| SOURCE OF DATA | WEIGHTAGE | RATINGS | P.MAX SCORE | CALC | SCORE | ☐ SCORE | REMARKS |
| | | | | | | Hide | |
| User Input/Business Data | High | 4 | 20 | 20 | 20 | 10.64 | Recommendations |
| User Input/Business Data | Medium | 2 | 12 | 6 | 6 | 3.19 | Recommendations |
| User Input/Business Data | Low | 3 | 4 | 3 | 3 | 1.60 | Recommendations |
| 58 | EC.Sub_T | 44.75 | | Total | 102.75 | | Hide |

INTELLIGENT SCORING SYSTEMS AND METHODS FOR SCORING A LEVEL OF PERFORMANCE OF A BUSINESS UNIT OF A PLURALITY OF BUSINESS UNITS IN AN ORGANIZATION

TECHNICAL FIELD

The present specification generally relates to intelligent scoring systems and methods, and, more specifically, intelligence scoring systems and methods for scoring a level of performance of a business unit of a plurality of business units in an organization.

BACKGROUND

Insurance companies and/or other businesses may include different business units and/or delivery units operating at different levels of efficiency that may be improved upon. However, it may be difficult and time consuming to evaluate performance of every business unit and/or delivery unit to determine capabilities and/or areas for improvement. Moreover, it may be difficult to determine strategies to improvement or to track such improvement in a meaningful way.

SUMMARY

Embodiments of the present disclosure are directed to intelligent scoring systems and methods for scoring a level of performance of a business unit of a plurality of business units in an organization to provide automated feedback of performance and may, in some embodiments, provide automated recommendations for improving performance.

For example, according to an embodiment of the present disclosure, an intelligent scoring system for scoring a level of performance of a business unit of a plurality of business units in an organization includes a scorecard tool, one or more user input devices, one or more memory components, one or more processors; and machine-readable instructions. The scorecard tool includes a scorecard and a neural network model. The one or more processors are communicatively coupled to the scorecard tool, the one or more user input devices, and the one or more memory components. The machine-readable instructions stored in the one or more memory components cause the intelligent scoring system to perform at least the following when executed by the one or more processors: receive from the one or more user input devices a parameter rating for the scorecard of the business unit for each of a first portion of a plurality of business performance parameters; automatically input the parameter rating for the scorecard of the business unit for each of a second portion of the plurality of business performance parameters; associate a weighting with each parameter rating; automatically estimate, via the neural network model, a parameter outcome score for each of the first portion and the second portion of the plurality of business performance parameters based on each respective parameter rating and each associated weighting; automatically estimate, via the neural network model, an overall outcome score indicating the level of performance of the business unit of the plurality of business units of the organization based on each parameter outcome score; and automatically generate one or more recommendations for improving the level of performance of the business unit based on the overall outcome score.

According to another embodiment of the present disclosure, a method for intelligent assessment of a business unit of a plurality of business units of an organization includes: receiving with one or more processors of an intelligent scoring system, a parameter rating for a scorecard of the business unit for each of a first portion of a plurality of business performance parameters; automatically inputting the parameter rating for the scorecard of the business unit for each of a second portion of the plurality of business performance parameters; associating a weighting with each parameter rating; automatically estimating, via a neural network model, a parameter outcome score for each of the first portion and the second portion of the plurality of business performance parameters based on each respective parameter rating and each associated weighting; automatically estimating, via the neural network model, an overall outcome score indicating a level of performance of the business unit of the plurality of business units of the organization based on each parameter outcome score; and automatically generating one or more recommendations for improving the level of performance of the business unit based on the overall outcome score.

In yet another embodiment of the present disclosure, a method for intelligent assessment of a business unit of a plurality of business units of an organization includes: retrieving, with one or more processors, business data stored on one or more memory components communicatively coupled to the one or more processors; automatically generating, via a neural network model, a rating parameter for one or more business performance parameters based the business data; associating a weighting with each parameter rating; automatically estimating, via the neural network model, a parameter outcome score for each of the one or more business performance parameters based on each respective parameter rating and each associated weighting; and automatically estimating, via the neural network model, an overall outcome score indicating a level of performance of the business unit of the plurality of business units of the organization based on each parameter outcome score.

Although the concepts of the present disclosure are described herein with primary reference to insurance business unit/delivery units, it is contemplated that the concepts will enjoy applicability to any setting for purposes of scoring and/or improving various business and/or delivery units within an organization.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

FIG. 4 depicts a graphical display of a scorecard generated by the intelligent scoring system of FIG. 2, according to one or more embodiments shown and described herein.

DETAILED DESCRIPTION

In embodiments described herein, an intelligent scorecard tool is configured to implement systems and methods to generate outcome scores indicating a level of performance of a business unit within an organization. The intelligent scorecard tool may further be configured to implement systems and methods to generate one or more recommendations for improving the level of performance of the business unit based on the outcomes scores. For example, business data 14 (such as for a business unit BU or a delivery unit DU) and/or user inputs may be used to generate parameter ratings related to a plurality of business performance parameters. Business performance parameters may include, but are not limited to value to core business, leadership, ownership, participation, responsibility, footprint, collaboration, employee band mix, number of subordinates, employee survey inputs, retention, process maturity/adoption, tool usage, or innovation culture, or any combination thereof. These will be described in greater detail herein.

At least a portion of the one or more of the business performance parameters may be automatically generated by the intelligent scorecard tool to automatically provide parameter ratings to at least a portion of the plurality of business performance parameters and automatically generate a parameter outcome scores based on the input parameter rating (e.g., either manually or automatically generated) and a weighting associated with each parameter rating. The intelligent scorecard tool may further estimate an overall outcome score for the business unit based on each parameter outcome score. Based on the overall outcome score, and/or individual parameters ratings or the parameter outcome sores, the scorecard tool may be configured to generate recommendations for improving the level of performance of the business unit. Accordingly, systems and methods as provided herein allow an organization to determine business unit performance and in some cases, micro-organizational scores to determine areas for improvement and/or recommendations for improvement. These and additional features will be described in greater detail below.

As used herein, a "business unit" (BU) may include any unit within a business and may encompass delivery units (DU). Accordingly, recitations directed to evaluating, scoring, and/or providing recommendations to a business unit, apply and also directed to embodiments evaluating, scoring, and/or providing recommendations to a delivery unit. Accordingly, a business unit may include micro-organization units such as units within sales, accounting, human resources, marketing, billing, shipping, etc. That is, as used herein, a "micro-organizational unit" may refer to business/delivery units which form part of larger business/delivery units within an organization. Micro-organizational units may be further divided based on for example, location, service areas, people practice groups, or the like.

Figure 1:
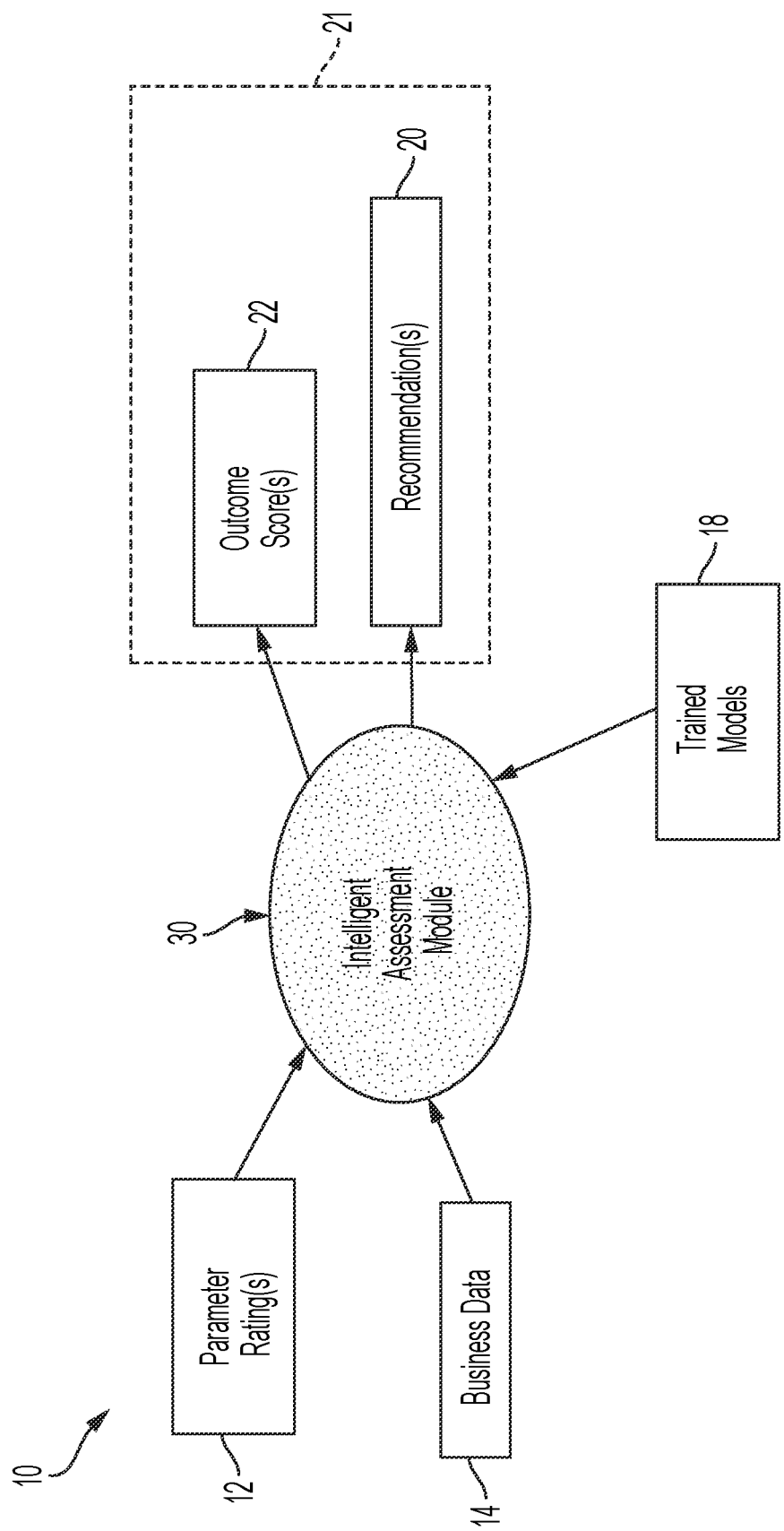
FIG. 1 depicts a scorecard tool including an intelligent assessment module employing one or more trained models to generate outcome scores and/or recommendations for improvement, according to one or more embodiments shown and described herein.

Referring now to FIG. 1, a scorecard tool 10 utilizing an intelligent assessment module 30 configured to automatically generate outcome score(s) 22 and/or recommendation (s) 20 for a business unit and/or micro-organizational unit is schematically depicted which may be output to a scorecard 21. As a non-limiting embodiment, user input or machine-generated parameter ratings 12, business data 14, one or more trained models 18 may feed into the intelligent assessment module 30, which output the outcome score(s) 22 (such as parameter outcome scores and/or overall outcome scores) and/or recommendation(s) 20. Outcome score(s) 22 and/or recommendation(s) 20 may be directed to specific business units and/or micro-organizational units within a business unit. That is, the intelligent assessment module 30 may drill down into micro-organization units (e.g., people, practice groups, etc.) to provide individualized feedback and scores.

As noted above, parameters ratings 12 may be input via a user, such as through a user input device (e.g., a computer, tablet, etc.) and/or may be automatically generated by the intelligent assessment module 30. Parameters scores 12 may include any business performance parameter assigned by and/or tracked by the organization. Business performance parameters may be divided between global capability, which may refer to a business units relationship with the entire organization and/or execution capability, which may refer to business performance parameters within the business unit itself. In embodiments, it is contemplated that business parameter ratings (e.g., global capability and/or execution capability characteristics) may be customized for a particular organization based on the particular organizations structure, goals, and/or needs. For example, and not as a limitation, business performance parameters for which parameters scores 12 may be assigned or generated may include global capability parameters such as, but not limited to value to core business, leadership, delivery responsibility, ownership, participation, responsibility, footprint, and execution capability parameters such as, but not limited to collaboration, employee band mix, number of subordinates, employee survey inputs, retention, process 200 maturity/adoption, tool usage, or innovation culture. However, and as noted above, business performance parameters which may receive a parameter rating may be adjusted or customized based on the organization. Each of these parameters are described in greater detail herein.

Global Capability Parameters

The following parameter descriptions are directed to global capability parameters which may be taken into account when scoring a global capability of various business units (e.g., teams) within an organization. It is noted that these parameters are exemplary, and that a greater number of parameters, a fewer number of parameters, or different parameters may be included without departing from the scope of the present disclosure.

The value to core business parameter may include a parameter rating 12 which rates the value of the business unit to the overall organization based on core business activity and/or business enabling activity, for example. Core business activity may refer the strategic tasks that improve customer value and/or drive profits (e.g., sales, manufacturing, and/or research and development may be considered core business activities). Non-core business activities may refer to activities outside of business activities or operations that are not a profit centered (e.g., accounting, in-house legal departments, etc.) may be considered non-core business activities. Business enabling activities may enable the continuation or practice of the business by performing necessary functions for continued business (e.g., accounting, payroll, billing, etc.). To determine value to core business that parameter rating may take into account both core business activity and business enabling activity. For example, a 2×2 quadrant mapping may be used to rate a business unit based on core business activity and business enabling activity. Table 1 below illustrates a 2×2 quadrant with an example rating which may be applied to a business unit based on value to core business. For example, low business enabling/non-core work business units may receive a low score (e.g., 1), high business enabling/non-core work, may receive a higher score (e.g., 2) than the low-business enabling/non-core work business units, low business enabling/core work may receive a higher score (e.g., 3) than the high business enabling/non-core work business units, and high business enabling/core work business units may receive the highest score (e.g., 4).

TABLE 1

2 × 2 QUADRANT

|  | Low Business Enabling | High Business Enabling |
| --- | --- | --- |
| core work 3 | 3 | 4 |
| non-core work 1 | 1 | 2 |

It is noted that though a scale of 1-4 is provided above with respect to the value to core business parameter, other rating scales are contemplated and possible. It is noted that the core business parameter may be input via a user or automatically generated via the intelligent scorecard tool 10. For example, the intelligent scorecard tool 10 using available business data 14 and/or artificial intelligence, may determine the value to core business parameter and apply it automatically.

The leadership parameter may refer to leadership traits within the organization. For example, a business unit may have managers moving from local to global roles, such as involvement in product road map, budget control, business goal identification, performance feedback, management of local leaders and teams, etc. The leadership parameter may, in some embodiments, be base based on the percentage of middle level managers and above performing global management roles out of the total number of managers in the business unit. For example, a rating of 1 may indicate the percentage of middle level managers and above performing global management roles within a business unit is less than about 20%, a rating of 2 may indicate the percentage of middle level managers and above performing global management roles within a business unit is larger than or equal to about 20% and less than about 50%, a rating of 3 may indicate the percentage of middle level managers and above performing global management roles within a business unit is larger than or equal to about 50% and less than about 80%, and a rating of 4 may indicate the percentage of middle level managers and above performing global management roles within a business unit is larger than or equal to 80%. However, other scales are contemplated and possible.

The leadership parameter rating may be entered into the intelligent assessment module 30 either manually or automatically generated via the intelligent scorecard tool 10. For example, the intelligent scorecard tool 10 using available business data 14 and/or artificial intelligence, may determine the leadership parameter and apply it automatically. For example, business data 14 may include role information of the various employees of the business unit to allow the system to automatically generate a leadership parameter rating for the business unit based on the known roles of the team members of the business unit.

The delivery responsibility parameter may be based on the responsibility of the business unit for completion of a project. For example, a rating of 1 may be assigned for a business unit that is responsible for specific assigned tasks, but not for significant completion of the project. A rating of 2 may be assigned for a business unit that has significant responsibility for a project but less than about 50% responsibility. A rating of 3 may be assigned to a business unit having greater than about 50% responsibility but less than about 100% responsibility for the delivery of the project. A rating of 4 may be assigned to a business unit having end to end (e.g., 100%) responsibility of the project. For example, a business unit with a 4 rating may have responsibility over budget, global team management, and/or vendor management. However, other scales are contemplated and possible.

The delivery responsibility parameter rating may be entered into the intelligent assessment module 30 either manually or automatically generated via the intelligent scorecard tool 10. For example, the intelligent scorecard tool 10 using available business data 14 and/or artificial intelligence, may determine the delivery responsibility parameter and apply it automatically. For example, business data 14 may include role information of the business unit to allow the system to automatically generate a delivery responsibility parameter rating(s) for the business unit based on the known roles of the team members of the business unit.

The ownership parameter may refer to functional ownership of modules owned and/or driven by the business unit. For example, functional ownership may refer to business units that have ultimate accountability for delivery of a product. In embodiments, the ownership parameter may be tied to the delivery responsibility. For example, where a delivery responsibility is low, the functional ownership may be low. However, where delivery responsibility is high, functional ownership may be high. In embodiments, a rating of 1 may be based on a delivery responsibility rating of 1 or 2. A rating of 2 may include application ownership/delivery responsibility, such as where a delivery rating is 3 or 4. However, functional ownership may further be analyzed based on leadership, research and development, or the like. For example in a technology firm, engineering leadership (e.g., end to end/product architecture design) may raise the functional ownership rating such as to a 3 or a 4. In some embodiments, product leadership (i.e., being responsible for creating business roadmaps, driving innovation, interaction with key business partners, review of market strategy, etc.) may lead to a high ownership rating for the ownership parameter. It is noted that other scales a contemplated and possible.

The ownership parameter rating may be entered into the intelligent assessment module 30 either manually or automatically generated via the intelligent scorecard tool 10. For example, the intelligent scorecard tool 10 using available business data 14, delivery responsibility parameter ratings, and/or artificial intelligence, may determine the ownership parameter and apply it automatically. For example, business data 14 may include role information to allow the system to automatically generate a ownership parameter rating(s) for the business unit based on the purpose/role of the business unit within the organization and/or the known roles of the team members of the business unit.

The participation parameter, also referred to as the transformative initiative, is directed to the transformative growth initiative. The transformative growth initiative may be may include technology initiatives but may be beyond technology and/or at the corporate level of the business. For example, the transformative growth initiative may be directed to the number of members of a team that work on initiatives directed to improvement, value, etc., such as long term initiatives. Accordingly, in an exemplary rating scale, a rating of 1 may include a percent of team members involved in a transformative growth initiative of less than about 10%, a rating of 2 may include a percent of team members involved in a transformative growth initiative of greater than or equal to about 10% to about 20 percent, a rating of 3 may include a percent of team members involved in a transformative growth initiative of greater than or equal to about 20% to about 30%, and a rating scale of 4 may include a percent of team members involved in a transformative growth initiative of greater than or equal to 30%. However, other rating scales are contemplated and possible.

The participation parameter rating may be entered into the intelligent assessment module 30 either manually or automatically generated via the intelligent scorecard tool 10. For example, the intelligent scorecard tool 10 using available business data 14 and/or artificial intelligence, may determine the participation parameter and apply it automatically. For example, business data 14 may include role information to allow the system to automatically generate a ownership parameter rating(s) the known roles of the team members of the business unit.

The responsibility parameter (also referred to as the managing leader parameter) may refer to the percentage of team members responsible for assigning work and/or setting strategy for their direct reports. That is the responsibility parameter may be a measurement of the percentage of the team taking on a managerial role. As an exemplary rating scale, a rating of 1 may include percent of team members serving in a managerial capacity of less than about 25%, a rating of 2 may include a percent of team members serving in a managerial capacity of greater than or equal to about 25% to about 50%, a rating of 3 may include a percent of team members involved in a transformative growth initiative of greater than or equal to about 50% to about 75%, and a rating scale of 4 may include a percent of team members involved in a transformative growth initiative of greater than or equal to 75%. However, other rating scales are contemplated and possible.

The responsibility parameter rating may be entered into the intelligent assessment module 30 either manually or automatically generated via the intelligent scorecard tool 10. For example, the intelligent scorecard tool 10 using available business data 14 and/or artificial intelligence, may determine the responsibility parameter and apply it automatically. For example, business data 14 may include role information to allow the system to automatically generate a responsibility parameter rating(s) based on the known roles of the team members of the business unit.

The footprint parameter (also referred to as a headcount landscape) may refer to the percentage of resources (e.g., percentage of people) available across the various locations of the organization, which may include vendors. For example, a particular footprint rating score may be based on the particular location being scored. As an exemplary footprint rating scale, a rating of 1 may include a percent of team members in a locality with respect to the total team members across locations of less than 25%, a rating of 2 may include a percent of team members in a locality with respect to the total team members across locations of greater than or equal to about 25% to about 50%, a rating of 3 may include a percent of team members in a locality with respect to the total team members across locations of greater than or equal to about 50% to about 75%, and a rating scale of 4 may include a percent of team members in a locality with respect to the total team members across locations of greater than or equal to about 75%. However, other rating scales are contemplated and possible.

The footprint parameter rating may be entered into the intelligent assessment module 30 either manually or automatically generated via the intelligent scorecard tool 10. For example, the intelligent scorecard tool 10 using available business data 14 and/or artificial intelligence, may determine the footprint parameter and apply it automatically. For example, business data 14 may include location information for team members that are part of the particular business unit to allow the system to automatically generate a footprint parameter rating.

Execution Capability Parameters

The following parameter descriptions are directed to execution capability parameters which may be taken into account when scoring an execution capability of various business units (e.g., teams) within an organization. It is noted that these parameters are exemplary, and that a greater number of parameters, a fewer number of parameters, or different parameters may be included without departing from the scope of the present disclosure.

The centers of excellence parameter provides a measurement of a business unit's participation in collaboration (e.g., promoting collaboration) and/or using best practices around a specific focus to drive business results (e.g., subject matter expertise and/or area of application). Stated another way, a center of excellence may be a team, a shared facility, or an entity that provides leadership, best practices, research support, and/or training for a focus area. As an example a center of excellence may be related to software tools, technologies, and/or associated business concepts. Accordingly, any business unit may be established as a center of excellence or may participate in a center of excellence. In an exemplary rating scale a rating of 1 may represent that the business unit has little or no representation in any center of excellence, a rating of 2 may represent a business unit has member(s) that are part of at least one center of excellence, a rating of 3 may represent that the business unit has member(s) that are part of multiple centers of excellence or at least one center of excellence is driven by the business unit, and a rating of 4 may represent that the business unit has multiple member(s) that are part of multiple centers of excellence AND at least one center of excellence is driven by the business unit. However, other rating scales are contemplated and possible.

The centers of excellence parameter rating may be entered into the intelligent assessment module 30 either manually or automatically generated via the intelligent scorecard tool 10. For example, the intelligent scorecard tool 10 using available business data 14 and/or artificial intelligence, may determine the centers of excellence parameter and apply it automatically. For example, business data 14 may include role information to allow the system to automatically generate a centers of excellence parameter rating(s) based on known roles of the team members of the business unit. For example, employee and/or business unit role information may include information about participation in one or more centers of excellence.

The employee band mix parameter may refer to how balanced the business unit of the organization is structured for management and execution of work. For example, is a business unit top heavy with managers or bottom heavy with non-managerial workers (e.g., individual contributors). In various organizations the structure of the employee band mix may be pyramid shaped, diamond shaped, or the like. Each layer of management may add and/or subtract from the parameter rating. In some embodiments, the employee band mix may include senior management, middle level management, first level management, and individual contributors (e.g., non-managerial contributors). Each hierarchal level may be individually rated and then combined into the parameter rating of the employee band mix. In an exemplary senior management rating scale, a rating of 1 may be awarded to groups with senior management of less than about 0.5% or greater than or equal to about 5%, a rating of 2 may be awarded to groups with senior management of greater than or equal to about 0.5% and less than about 1% OR greater than or equal to about 3.5% and less than about 5%, a rating of 3 may be awarded to groups with senior management of greater than or equal to about 1% and less than about 1.5% OR greater than or equal to about 2.5% and less than about 3.5%, and a rating of 4 may be awarded to groups with senior management of greater than or equal to about 1.5% and less than about 2.5%. For middle level managers, a rating of 1 may be awarded to groups with middle level management of less than about 10% or greater than or equal to about 40%, a rating of 2 may be awarded to groups with middle level management of greater than or equal to about 10% and less than about 15% OR greater than or equal to about 30% and less than about 40%, a rating of 3 may be awarded to groups with middle level management of greater than or equal to about 15% and less than about 20% OR greater than or equal to about 25% and less than about 30%, and a rating of 4 may be awarded to groups with middle level management of greater than or equal to about 20% and less than about 25%. For first level managers, a rating of 1 may be awarded to groups with first level management of less than about 9% or greater than or equal to about 35%, a rating of 2 may be awarded to groups with first level management of greater than or equal to about 9% and less than about 13% OR greater than or equal to about 30% and less than or equal to about 34%, a rating of 3 may be awarded to groups with first level management of greater than or equal to about 13% and less than about 18% OR greater than or equal to about 24% and less than or equal to about 29%, and a rating of 4 may be awarded to groups with first level management of greater than or equal to about 18% and less than or equal to about 23%. For individual contributors, a rating of 1 may be awarded to groups with individual contributors of less than about 20% OR greater than or equal to about 80%, a rating of 2 may be awarded to groups with individual contributors of greater than or equal to about 20% and less than about 40% OR greater than or equal to about 70% and less than about 80%, a rating of 3 may be awarded to groups with individual contributors of greater than or equal to about 40% and less than about 50% OR greater than or equal to about 60% and less than about 70%, and a rating of 4 may be awarded to groups with individual contributors of greater than or equal to about 50% and less than about 60%. The ratings of the various levels may then be combined (e.g., added) into a combined score. It is noted that the above rating scales are exemplary in nature, and other rating scales are contemplated and possible.

The employee band mix parameter rating may be entered into the intelligent assessment module 30 either manually or automatically generated via the intelligent scorecard tool 10. For example, the intelligent scorecard tool 10 using available business data 14 and/or artificial intelligence, may determine the employee band mix parameter and apply it automatically. For example, business data 14 may include role information to allow the system to automatically generate an employee band mix parameter rating based on known roles of the team members of the business unit.

The number of subordinates parameter (also referred to as the span of control parameter) refers to the number of subordinates managed effectively and efficiently by reporting managers. That is each level of management within the business unit may be scored and the scores combined to determine the overall score for the parameter In an exemplary senior management rating scale, a rating of 1 may be awarded to groups with about 20 or more reportees (subordinates), a rating of 2 may be awarded to groups with greater than or equal to about 15 and less than about 20 reportees, a rating of 3 may be awarded to groups with greater than or equal to about 10 and less than about 15 reportees, and a rating of 4 may be awarded to groups with less than about 10 reportees. The same rating scales may be applied to each subsequent management level (e.g., middle level management and/or first level management). The score of each management level may be combined to determine a combined score for the number of subordinates parameter. However, it is noted, different rating scales are contemplated and possible.

The number of subordinates parameter rating may be entered into the intelligent assessment module 30 either manually or automatically generated via the intelligent scorecard tool 10. For example, the intelligent scorecard tool 10 using available business data 14 and/or artificial intelligence, may determine the number of subordinates parameter and apply it automatically. For example, business data 14 may include role information to allow the system to automatically generate an number of subordinates parameter rating based on known roles of the team members of the business unit.

The employee survey inputs parameter may be directed to employee satisfaction measurements which may be obtained via periodic surveys from employees. For example, the employee survey may ask for ratings of individual satisfaction. The ratings may then be averaged to determine the employee satisfaction throughout the business unit. Higher employee satisfaction may prove high engagement and/or intent to stay, which may provide an indication of stability and retention of talent (and knowledge) by the business unit. As an exemplary rating scale, a rating of 1 may indicate employee satisfaction of less than about 65%, a rating of 2 may indicate employee satisfaction of between about 65% and about 74%, a rating of 3 may indicate employee satisfaction of between about 75% to about 90%, and a rating of 4 may indicate employee satisfaction of greater than about 90%.

The employee survey inputs parameter rating may be entered into the intelligent assessment module 30 either manually or automatically tabulated and input via the intelligent scorecard tool 10. For example, the intelligent scorecard tool 10 may receive survey data from employee surveys, such as part of the business data 14, and automatically tabulate the results. Based on the results, the intelligent scorecard tool 10 may generate the employee survey inputs parameter rating.

The retention parameter may refer to stability of business unit members and thereby retention of knowledge within the business unit. The retention rating may be based on a per year retention, per quarter retention, or other time period. As an exemplary rating scale, a rating of 1 may have a retention rate of less than 82%, a rating of 2 may have a retention rate of between about 82% and about 85%, a rating of 3 may have retention rate of between about 85% and about 88%, and a rating of 4 may have a retention rate of about 88% or higher, though other scales are contemplated and possible.

The retention parameter rating may be entered into the intelligent assessment module 30 either manually or automatically generated via the intelligent scorecard tool 10. For example, the intelligent scorecard tool 10 using available business data 14 and/or artificial intelligence, may determine the number of employees that have left versus the number of employees that have stayed for a time frame and apply it automatically. For example, business data 14 may include employee movement data to determine current and former employees to determine the retention parameter rating for an evaluation period.

The process maturity/adoption parameter may refer to current process standardization and optimization approach and alignment with global counterparts to improve project management practices. That is, the process maturity/adoption parameter provides a measure of how well processes are defined to ensure continuous operation in face of employee or team member turnover. As an exemplary rating scale, a rating of 1 may be awarded where basic processes are defined, a rating of 2 may be awarded when some level of process standardization and process efficiency gains have been achieved, a rating of 3 may be awarded where high level process standardization efficiency gain is achieved with improved process transformation capabilities; and a rating of 4 may be awarded for enterprise portfolio management process innovation and new product services. However, other rating scales are contemplated and possible.

The process maturity/adoption parameter rating may be entered into the intelligent assessment module 30 either manually or automatically generated via the intelligent scorecard tool 10. For example, the intelligent scorecard tool 10 using available business data 14 and/or artificial intelligence, may determine the process maturity/adoption parameter and apply it automatically. For example, business data 14 may include defined processes associated with the business unit, based on the number of defined processes associated with the business unit the process maturity/adoption parameter may be automatically generated.

The tool usage parameter may refer to level of effective and efficient usage of tools (e.g., software) in the business unit. For example, a rating of 1 may indicate that the business unit has tools available and are used for, for example, tracking and/or work intake purposes but not embedded within the work flow, a rating of 2 may indicate the business unit has tools available, which are used for work intake, tracking, and basic project management, a rating of 3 may indicate the business unit has the tool embedded within its processes and are used for intake, track, project management, review, and reporting, and a rating of 4 may indicate the business unit has the tool embedded within its processes and are used for intake, track, project management, review, and reporting, and the tool may incorporate automated procedures for the various tasks associated with the business unit. However, other rating scales are contemplated and possible.

The tool usage parameter rating may be entered into the intelligent assessment module 30 either manually or automatically generated via the intelligent scorecard tool 10. For example, the intelligent scorecard tool 10 using available business data 14 and/or artificial intelligence, may determine the tool usage parameter and apply it automatically. For example, business data 14 may define tools available to the business unit and assess a percentage usage (e.g., for the business unit, per user, or the like), and based on the usage (e.g., such as recorded tool usage time, number of times used, etc.) of the tool(s) available, automatically determine the tool usage parameter rating.

The innovation culture parameter may provide a rating with respect to the involvement and/or contribution of the business unit toward innovation and ideas. For example, business units with better innovation culture may nurture knowledge and bring an entrepreneurial mindset. Different factors which may be used measuring an innovation culture parameter may include the rate at which new ideas are raised and implemented, the number of patents/patent applications generated, etc. In some embodiments, these ratings may be separated and summed together to get an overall rating scale. For example, a rating scale for the rate at which new ideas are raised and implemented out of a total submitted may be rated on a scale of 1-4, with a rating scale of 1 indicating that less than 20% of ideas are implemented, a rating scale of 2 indicating that between about 20% to about 30% of ideas are implements, a rating of 3 indicating that between about 30% to about 40% of ideas are implemented, and a rating of 4 where about 40% or more of ideas are implements. In another example, a rating scale based on patents/patent applications may also be rated on a scale of 1-4, where a rating of 1 indicates there are no patent submissions to the legal team, a rating of 2 indicates 1 patent submission to the legal team, a rating of 3 indicates more than 1 patent submission to the legal team, and a rating of 4 indicates more than 1 patent has been filed and at least 1 patent submission approved by the legal team for filing. In some embodiments, both ratings may be contemplated and a summation of ratings included.

The innovation culture parameter rating may be entered into the intelligent assessment module 30 either manually or automatically generated via the intelligent scorecard tool 10. For example, the intelligent scorecard tool 10 using available business data 14 and/or artificial intelligence, may determine the innovation culture parameter and apply it automatically. For example, business data 14 may include information related to, for example, recent patent filings, patent submissions to legal, idea submissions, etc., within the business unit and assess and automatically generate the innovation culture parameter rating, based on said submissions.

Figure 2:
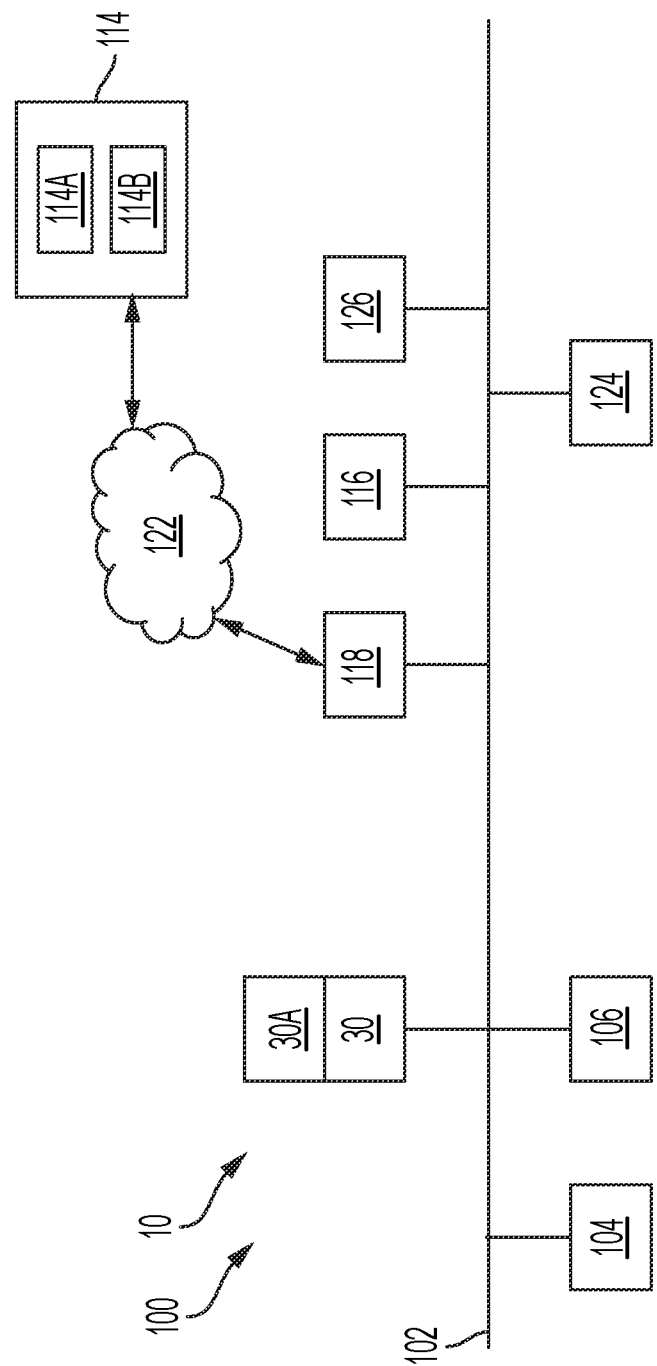
FIG. 2 schematically illustrates a computer implemented intelligent scoring system including the scorecard tool of FIG. 1 for use in the process flows described herein, according to one or more embodiments shown and described herein.

As noted above, the above plurality of business performance parameters may be entered directly into the scorecard 21 via one or more user input devices 126 (such as depicted in FIG. 2) and/or automatically input to the scorecard 21 generated via the intelligent scorecard tool 10. For example, the intelligent scorecard tool 10 may, using available business data 14, for the business unit generate a portion of the plurality of business performance parameters. The plurality of business performance parameters may include any number of the above described parameters such as at least two of the above-described business performance parameters.

It is noted that each of the above business unit parameters may be weighted based on an impact to the business unit and/or the organization. For example, the business unit parameters may each be weighted as high, medium, or low importance to the business unit. In some embodiments, such weights may be manually indicated. However, in some embodiments, machine learning and artificial intelligence, such as applied via one or more trained models 18, may be used to determine a weight of the parameter to the business unit and/or the organization. As will be described in greater detail herein, once the rating scores have been determined the intelligent scorecard tool 10 may automatically calculate a parameter outcome score for each of the business performance parameters based on each respective parameter rating and each associated weighting. The parameter outcome scores may be summed together and provided as the overall outcome score indicating the level of performance of the business unit. In some embodiments, and as will be described in greater detail herein, recommendation(s) 20 based on the outcome scores 22 (e.g., parameter outcome scores and/or the overall outcome score) may be provided by the intelligent scorecard tool 10.

As noted above, in embodiments a parameter rating for the scorecard 21 of the business unit may be received via one or more user input devices 126 for each of a first portion of the plurality of business performance parameters. A parameter rating for the scorecard 21 of the business unit for each of a second portion of the plurality of business performance parameters may be automatically input via the intelligent scoring system 100. For example about 10% of the parameters ratings may be input via a user, and about 90% of the parameter ratings may be automatically generated via the intelligent scorecard tool 10. In some embodiments, about 80% of the parameters ratings may be input via a user, and about 80% of the parameter ratings may be automatically generated via the intelligent scorecard tool 10. In some embodiments, about 70% of the parameter ratings may be input via a user, and about 70% of the parameter ratings may be automatically generated via the intelligent scorecard tool 10. However, other ratios between manually input and automatically generated parameter ratings are contemplated and possible.

In embodiments, business data 14 (FIG. 1), such as noted above, may include any information about the business unit from one or more information sources (e.g., input provided via authorized personnel, information stored on a remote server 114 (FIG. 2), local memory, or the like) which provides information related to one or more of business performance parameters such as discussed herein. For example, as shown in FIG. 1, business data 14 may include information related to employees, job descriptions, software usage data, tool usage data, key responsibilities, department operation statistics, etc., which may be useful in determining parameter ratings 12, outcome scores 22, and/or recommendations (20).

The one or more trained models 18 may be trained on a training set(s) to generate parameter rating(s) 12, outcome score(s) 22, and/or recommendation(s) 20. In embodiments, the one or more trained models 18 include neural network models configured to determine parameter ratings and/or outcome score(s) 22, weighting models configured to weigh the various parameters effects on outcome score(s) 22, and/or recommendation models (e.g., a neural network recommendation model) configured to generate recommendation(s) for improvement of the business unit based on the outcome score(s).

One or more training modules 30A (schematically illustrated in FIG. 2), as described herein and in greater detail further below is configured to train such a trained models 18, for example using one or more pre-stored parameter rating sets, business data 14, and/or existing outcome recommendations. For example, training sets, may include business data 14, which may be correlated to existing parameter ratings, and resulting recommendations 20, to allow the intelligent assessment module 30 to predict or determine weightings, outcome score(s), and/recommendation(s). Such data sets may be stored on a memory component 106, a database, and/or within a remote server 114.

In some embodiments, synthetic or staged data may be used for training the one or more trained models 18, as opposed to real business data 14, parameter ratings, and/or recommendations 20. With reference to the use of training or trained herein, it is to be understood that, in an embodiment, a model object is trained or configured to be trained and used for data analytics as described herein and includes a collection of training data sets based on data sets placed within the model object. The intelligent scoring system 100 may apply the one or more trained models 18 to the data sets to generate parameter ratings, weightings, outcome score(s), and/or recommendation(s), as described herein.

The intelligent scorecard tool 10 may be communicatively coupled to a "big data" environment including a database configured to store and process large volumes of data in such an environment. The database may be, for example, a structured query language (SQL) database or a like database that may be associated with a relational database management system (RDBMS) and/or an object-relational database management system (ORDBMS). The database may be any other large-scale storage and retrieval mechanism including, but not limited to, a SQL, SQL including, or a non-SQL database. For example, the database may utilize one or more big data storage computer architecture solutions. Such big data storage solutions may support large data sets in a hyperscale and/or distributed computing environment, which may, for example, include a variety of servers utilizing direct-attached storage (DAS). Such database environments may include Hadoop, NoSQL, and Cassandra that may be usable as analytics engines. Thus, while SQL may be referenced herein as an example database, it is understood that any other type of database capable of supporting large amounts of data, whether currently available or yet-to-be developed, and as understood to those of ordinary skill in the art, may be utilized.

FIG. 2 illustrates a computer implemented intelligent scoring system 100 for use with the methods described herein, such as method 200 of FIG. 3 described in greater detail below. Referring to FIG. 2, a non-transitory, intelligent scoring system 100 is configured for implementing a computer and software-based method, such as directed by the intelligent scorecard tool 10 and the processes described herein, to automatically generate parameter ratings, outcome score(s), and/or recommendation(s). The intelligent scoring system 100 includes the intelligent scorecard tool 10 of FIG. 1 to automatically generate parameter ratings, weightings, outcome score(s) 20, and or recommendations 20. The intelligent scoring system 100 further includes a communication path 102, one or more processors 104, a non-transitory memory component 106, the intelligent assessment module 30, a training module 30A of the intelligent assessment module 30, one or more remote servers 114 (e.g., a business data server 114A, a training data server 114B, or the like), a machine-learning module 116, network interface hardware 118, a network 122, a display 124, and one or more user input devices 126. It is noted that systems according to the present disclosure may include a greater or fewer number of modules without departing from the scope of the present disclosure. The lines depicted in FIG. 2 indicate communication rather than physical connection between the various components.

As noted above, the intelligent scoring system 100 comprises the communication path 102. The communication path 102 may be formed from any medium that is capable of transmitting a signal such as, for example, conductive wires, conductive traces, optical waveguides, or the like, or from a combination of mediums capable of transmitting signals. The communication path 102 communicatively couples the various components of the intelligent scoring system 100. As used herein, the term "communicatively coupled" means that coupled components are capable of exchanging data signals with one another such as, for example, electrical signals via conductive medium, electromagnetic signals via air, optical signals via optical waveguides, and the like. Accordingly, communication may be facilitated through wired and/or wireless transmissions of data signals.

The intelligent scoring system 100 of FIG. 2 also comprises the processor 104. The processor 104 can be any device capable of executing machine-readable instructions. Accordingly, the processor 104 may be a controller, an integrated circuit, a microchip, a computer, or any other computing device. The processor 104 is communicatively coupled to the other components of the intelligent scoring system 100 by the communication path 102. Accordingly, the communication path 102 may communicatively couple any number of processors 104 with one another, and allow the modules coupled to the communication path 102 to operate in a distributed computing environment. Specifically, each of the modules can operate as a node that may send and/or receive data.

The illustrated intelligent scoring system 100 further comprises the memory component 106, which is coupled to the communication path 102 and communicatively coupled to the processor 104. The memory component 106 may be a non-transitory computer readable medium or non-transitory computer readable memory and may be configured as a nonvolatile computer readable medium. The memory component 106 may include RAM, ROM, flash memories, hard drives, or any device capable of storing machine-readable instructions such that the machine-readable instructions can be accessed and executed by the processor 104. The machine-readable instructions may include logic or algorithm(s) written in any programming language such as, for example, machine language that may be directly executed by the processor 104, or assembly language, object-oriented programming (OOP), scripting languages, microcode, etc., that may be compiled or assembled into machine-readable instructions and stored on the memory component 106. Alternatively, the machine-readable instructions may be written in a hardware description 402 language (HDL), such as logic implemented via either a field-programmable gate array (FPGA) configuration or an application-specific integrated circuit (ASIC), or their equivalents. Accordingly, the methods described herein may be implemented in computer programming languages, as pre-programmed hardware elements, or as a combination of hardware and software components.

The intelligent scoring system 100 may include the intelligent assessment module 30 and the machine-learning module 116, as described above, communicatively coupled to the one or more processors 104. The intelligent assessment module 30 is configured to at least apply data analytics and artificial intelligence algorithms and trained models 18 to received business data 14, parameter ratings, or the like. The machine-learning module 116 is configured for providing such artificial intelligence algorithms and models 18, such as to the intelligent assessment module 30. The machine-learning module 116 may include an artificial intelligence (AI) component to train and provide machine-learning capabilities to a neural network as described herein.

By way of example, and not as a limitation, a recurrent neural network (RNN), such as a unidirectional Gated Recurrent Unit (GRU). The GRU may be utilized with an attached time distributed sigmoid layer and/or other activation function such as a linear function, a step function, another logistic (sigmoid) function, a tanh function, or a rectified linear unit (ReLu) function. Other RNN architecture is within the scope of this disclosure, such as Long Short-Term Memory (LSTM), other GRU applications, or a standard RNN. Other artificial neural networks are further contemplated in addition to or alternative the intelligent prediction systems and methods described herein, such as convolutional neural networks (CNN) and the like as understood to those skilled in the art.

The intelligent assessment module 30 may include a training module 30A which may process training data sets of business data 14 and/or historical parameter ratings, outcome scores, and/or recommendations to train one or more trained models 18 for determination of parameter ratings, weightings, outcome scores 22, and/or recommendations 20. Training data sets stored and manipulated in the intelligent scoring system 100 as described herein may be utilized by the machine-learning module 116, which is able to leverage, for example, a cloud computing-based network configuration to apply Machine Learning and Artificial Intelligence. This machine learning application may create models that can be applied by the intelligent scoring system 100, to make it more efficient and intelligent in execution. As an example and not a limitation, the machine-learning module 116 may include artificial intelligence components selected from the group consisting of an artificial intelligence engine, Bayesian inference engine, and a decision-making engine, and may have an adaptive learning engine further comprising a deep neural network-learning engine. It is contemplated and within the scope of this disclosure that the term "deep" with respect to the deep neural network-learning engine is a term of art readily understood by one of ordinary skill in the art.

As described above, data sets including historical parameter ratings, outcome scores 22, and/or recommendations 20, may be used for training the one or more models 18. Such training data set may be stored on the memory component 106, a database, and/or within a remote server 114. As a non-limiting example, the data sets may be utilized to train one or more neural network models 18, such as an outcome score model, a weighting model, and/or a recommendation model. In some embodiments, synthetic data may be used for training the one or more models.

As noted above, the intelligent scoring system 100 may be trained to output parameter rating(s) 12 for at least a portion of the business performance parameters, weightings applied to each parameter rating, a parameter outcome score for each rating based on the parameter rating and the weighting applied to each parameter rating, an overall outcome score, which may be based on the parameter outcome scores, and one or more recommendations 20 based on the overall outcome score, the weightings, individual parameter scores, or the like. The various outputs may be generated for business units and/or micro-organization units to provide targeted recommendations 20 for improvement and may be displayed on a scorecard 21, which may be displayed to the user on the display 124.

Still referring to FIG. 2, the intelligent scoring system 100 comprises the network interface hardware 118 for communicatively coupling the intelligent scoring system 100 with a computer network such as network 122. The network interface hardware 118 is coupled to the communication path 102 such that the communication path 102 communicatively couples the network interface hardware 118 to other modules of the intelligent scoring system 100. The network interface hardware 118 can be any device capable of transmitting and/or receiving data via a wireless network. Accordingly, the network interface hardware 118 can include a communication transceiver for sending and/or receiving data according to any wireless communication standard. For example, the network interface hardware 118 can include a chipset (e.g., antenna, processors 104, machine readable instructions, etc.) to communicate over wired and/or wireless computer networks such as, for example, wireless fidelity (Wi-Fi), WiMax, Bluetooth, IrDA, Wireless USB, Z-Wave, ZigBee, or the like.

The network 122 can include any wired and/or wireless network such as, for example, wide area networks, metropolitan area networks, the internet, an intranet, satellite networks, or the like. Accordingly, the network 122 can be utilized as an access point by the intelligent scoring system 100 to access one or more servers 114 (e.g., a business data server 114A, a training data server 114B, or the like). The one or more servers 114 may generally comprise processors, memory, and chipset for delivering resources via the network 122. Resources can include providing, for example, processing, storage, software, and information from the one or more servers 114 to the intelligent scoring system 100 via the network 122. Additionally, it is noted that the one or more servers 114 and any additional servers can share resources with one another over the network 122 such as, for example, via the wired portion of the network 122, the wireless portion of the network 122, or combinations thereof.

The business data server 114A may include, for example, the business data 14 related to the performance of the business unit. For example, business data 14 may include any information available and/or stored as business data 14 such as, but not limited to, employees (including number, gender, age, education, position, duties, etc.), business performance metrics (e.g., sales, goals, completed projects, tools, usage rates, etc.), location information, and any other information which may be relevant to the plurality of business performance parameters such as described herein. As described above, the one or more processors 104 may execute logic stored on the memory component 106 to determine, based on the business data 14, parameter ratings 12 for one or more of the business performance parameters, weightings, outcome score(s), and/or recommendations 20 based on the business data 14. In some embodiments, manually input rating scores 12 may be also be used in generating automatically generated parameter ratings, weightings, outcome score(s) 22, and/or recommendations 20.

The training data server 114B may store historical parameter ratings, weightings, outcome scores, and/or recommendations, which may be used to train and/or update the model 18 to identify patterns indicative of increasing and/or decreasing parameter ratings, weightings, and/or outcome scores 22. Based on such adjustments, recommendations 20 may be adjusted to improve the level of performance of the business unit. In some embodiments, as described above, the training data may not be historical data, but may be synthetic data.

Figure 5:
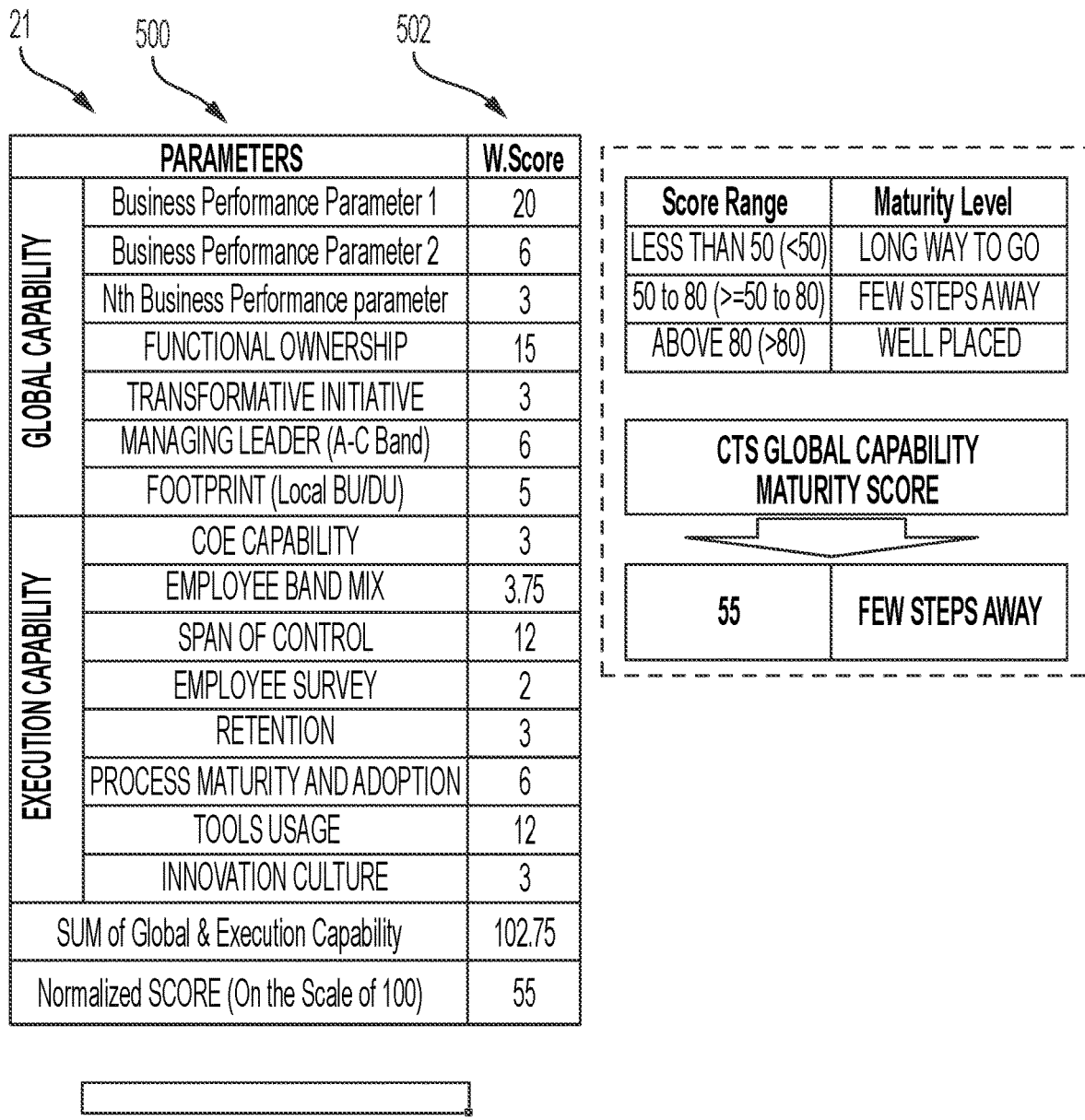
FIG. 5 depicts a graphical display of another scorecard generated by the intelligent scoring system of FIG. 2, according to one or more embodiments shown and described herein.
Figure 5:
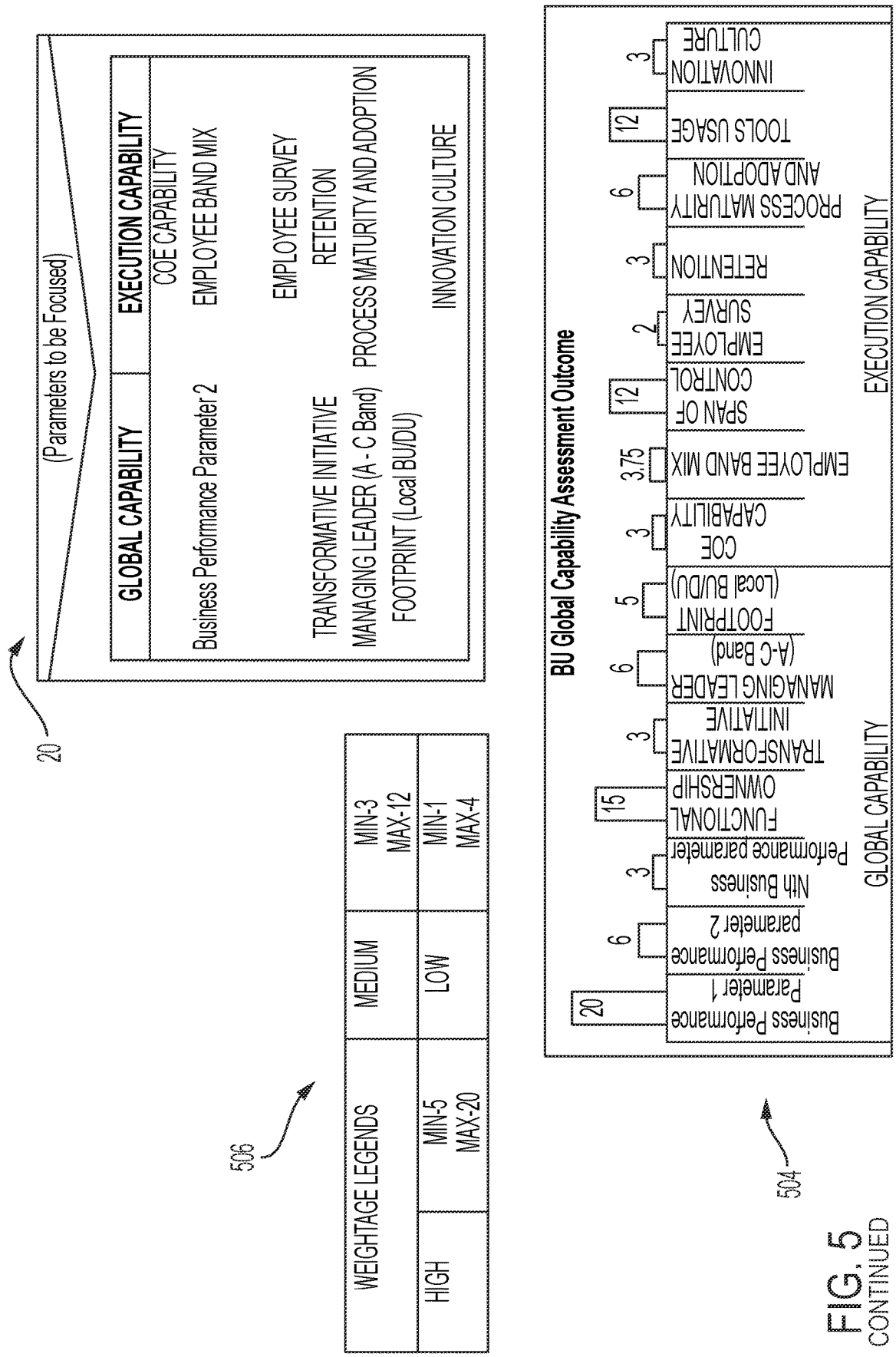

Still referring to FIG. 2, as noted above, the intelligent scoring system 100 may include the display 124 for providing visual output including, for example, the scorecard 21. The display 124 is coupled to the communication path 102 and communicatively coupled to the processor 104. Accordingly, the communication path 102 communicatively couples the display 124 to other modules of the intelligent scoring system 100. The display 124 can comprise any medium capable of transmitting an optical output such as, for example, a cathode ray tube, light emitting diodes, a liquid crystal display, a plasma display, or the like. As will be described in greater detail below the display 124 may be caused to display 124 one or more graphical depictions of the scorecard 21 (e.g., as illustrated in FIGS. 4 and 5), which will be described in greater detail below.

In some embodiments, the one or more user input devices 126 may be communicatively coupled to the one or more processors 104 over the communication path 102. The one or more user input devices 126 may comprise any device configured to interact with the intelligent scoring system 100 to allow a user to provide inputs into the intelligent scoring system 100. For example, user input devices 126 may include, but are not limited to, any number of knobs, buttons, keyboards, joysticks, microphones, touchscreen interfaces, or the like. As noted herein, using the one or more user input devices 126, a user may input parameter ratings 12 manually to a portion of the plurality of business performance parameters. In embodiments, the one or more user input devices 126 may further allow a user to interact with the scorecard 21 to toggle or scroll through various portions of the scorecard 21.

Figure 3:
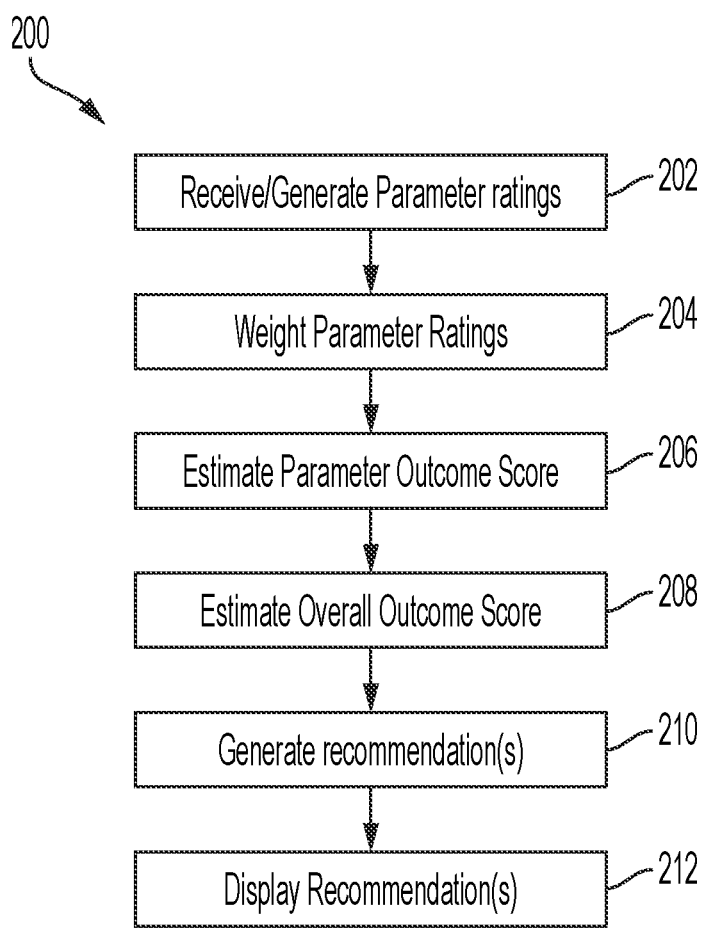
FIG. 3 depicts a flowchart illustrating a method for use of scorecard tool of FIG. 1 and the intelligent scoring system of FIG. 2, according to one or more embodiments shown and described herein.

Referring to FIG. 3, a method 200 for intelligent assessment of a business unit of a plurality of business units as a control scheme process is schematically depicted. In particular, the method 200 utilizes the intelligent scorecard tool 10 and intelligent scoring system 100 as described herein, to automatically generate parameter ratings 12, weightings, outcome score(s) 22 (e.g., parameter outcome scores and/or overall outcome scores), and/or recommendations 20 for improving performance of the business unit. It is noted that a greater or fewer number of steps may be included without departing from the scope of the present disclosure. Additionally, the various steps may be performed in a different order from that depicted without departing from the scope of the present disclosure.

For example, in some embodiments, the method 200 may include at block 202 receiving and/or generating with one or more processors 104 of the intelligent scoring system 100 the parameter ratings 12 of the plurality of parameter ratings 12. For example, the method 200 at block 202 may include reciting from the one or more user input devices 126 a parameter rating 12 for the scorecard 21 of the business unit for each of a first portion of a plurality of business performance parameters. The intelligent scoring system 100 may receive manually input parameter ratings 12 for the first portion of the plurality of business performance parameters. Block 202 may further include automatically inputting the parameter rating(s) 22 for the scorecard 21 of the business unit for each of a second portion of the plurality of business performance parameters. For example, the method 200 may include retrieving, with the one or more processors 104, business data 14 stored on one or more memory components and determining the parameter rating for the scorecard 21 of the business unit for each of the second portion of the plurality of business performance parameters, such as via the trained model 18 (e.g., a neural network model), based on the business data 14. Accordingly, in embodiments, the method 200 may include receiving manually input parameter ratings for the first portion of the plurality of business performance parameters and automatically generating, via the trained model 18, the parameter rating for each of the second portion of the plurality of business performance parameters based on the user rating score and the business data 14.

At block 204, the method 200 includes associating a weighting with each parameter rating 12. For example, the weighting may cause a business performance parameter to have a greater or lesser impact on the overall outcome score. Business units associated with engineering or product development may have a higher weighting for parameter scores directed to, for example, innovation culture while business units associated with accounting may have a lesser impact from innovation culture. In some embodiments, the weighting may be determined via a weight model of the one or more trained models 18, such that the intelligent scoring system 100 determines the appropriate weighting based on machine learning and artificial intelligence. For example, the weighting model may be trained to identify business units and impacts of various business parameters to the business unit to identify the most and/or least impactful business parameters to determine high, medium, and low impact parameters.

At block 206, the method 200 may include automatically estimating, via a trained model 18 such as included in the intelligent assessment module 30, a parameter outcome score for each of the first portion and the second portion of the plurality of business performance parameters based on each respective parameter rating and each associated weighting. For example, the weighting may be multiplier multiplied against the parameter rating to increase and/or decrease the impact of the business performance parameter.

At block 208, the method 200 may include automatically estimating, via the neural network model 18, an overall outcome score 22 indicating a level of performance of the business unit of the plurality of business units of the organization based on each weighted parameter outcome score 22. For example, the overall outcome score 22 may be based on a summation of the parameter outcome scores 22.

At block 210, the method 200 may include automatically generating one or more recommendations 20 for improving the level of performance of the business unit based on the overall outcome score 22, individual parameter ratings, weighted parameter weightings, or the like. In embodiments, the recommendation may include reorganization of employees, employee additions, shifting business unit goals, emphasis on particular business unit goals, etc. In embodiments, the overall outcome score 22 may include generating one or more micro-organization scores, e.g., scores for sub groups of business units, teams, or the like. Accordingly, in such embodiments, the one or more recommendations 20 for improving the level of the performance of the business unit may comprise a recommendation to at least one micro-organizational entity. For example, recommendations 20 may be generated specific to subgroups within a business unit. For example, a sales unit of a business unit, may include micro-organizational units focused on different products and/or geographic locations. The one or more recommendations 20 may include recommendations 20 related to the different product sales and/or the various geographic locations.

At block 212, the method 200 may include automatically displaying, on the display 124 communicatively coupled to the one or more processors 104, one or more portions of the scorecard 21. For example, and as depicted in FIG. 4, the display 124 may display 124 a graphical image of the scorecard 21 including a chart of the plurality of business parameters such as depicted in the first column of the chart. The plurality of business performance parameters may include any of the business performance parameters such as described herein. For example, the plurality of business performance parameters may include a first business performance parameters 400a, and second business performance parameter 400b, and an nth business performance parameter 400c. In embodiments, the scorecard 21 may include a description 402 of the business performance parameters. In some embodiments, the scorecard 21 may further include a rating description 404 of the business performance parameter, indicating how the business performance parameter is rated, such as described above with respect to each of the business performance parameters described herein. In some embodiments, a source 406 of the parameter and/or the data used for determining the parameter rating may be displayed on the scorecard 21. For example, in some embodiments, the intelligent scoring system 100 may indicate the a parameter rating is based on a user input or automatically generated based on available business data 14 by the intelligent assessment module 30. In some embodiments, the weightage 408 applied to the parameter rating may be displayed on the scorecard 21. For example, and as described herein weightages may be high, medium, or low and may have multipliers associated therewith. As noted above, the weightage 408 may be determined via the intelligent assessment module 30 based on such factors as the type of business unit, responsibilities of the business unit, or the like. In some embodiments, using machine learning and artificial intelligence, the intelligent scoring system 100 may determine weightages within a business unit based on trend data and/or correlations.

In some embodiments, and as shown in FIG. 4, the scorecard 21 may further display a maximum score available to particular parameter. This may allow a user of the scorecard 21 to understand the max score available for a particular business performance parameter. The scorecard 21 may further display 124 a calculated score and/or a total score 414, which may be the score of a particular business performance parameter prior to weighting of the score. In embodiments, the outcome parameter score 418 may be displayed to the user. As depicted the overall outcome score 419, may be the summation of the weighted outcome parameter scores 418. In some embodiments, a maximum outcome score 412 may be displayed to allow a user to readily compare the achieved overall outcome score with the maximum achievable overall outcome score. Additional information such as business unit, micro-organization unit, assessment date, remarks, totals for specific types of business performance parameters (e.g., global capability parameters, and/or execution capability parameters), the above described 2×2 matrix, or the like may be provided within the scorecard 21. For example, in some embodiments, one or more recommendations 20 may be displayed in the remarks section or elsewhere on the scorecard 21.

Referring to FIG. 5, one or more summary tables 500 may be displayed on the scorecard 21. For example, the one or more summary tables 500 may display outcome parameter ratings (e.g., such as in a numerical table 502, or via a chart such as a bar chart 504), one or more legends 506 for interpreting the results, e.g., score range versus maturity level (or room to improve) and/or providing weightages. In some embodiments, specific groupings (e.g., global capability and/or execution capability scores) of performance parameter ratings may be summarized. For example, global capability and/or execution capabilities may be individually displayed. In some embodiments, one or more recommendations 20 may be displayed in the one or more summary tables indicating one or more parameters which may benefit from additional focus by the business unit.

It should now be understood that embodiments of the present disclosure are directed to an intelligent scorecard tool configured to implement systems and methods to generate outcome scores indicating a level of performance of a business unit within an organization. The intelligent scorecard tool may further be configured to implement systems and methods to generate one or more recommendations for improving the level of performance of the business unit based on the outcomes scores. The outcome scores and/or the recommendations may be displayed to a user via a scorecard on a display for ready understanding and implementation of improvements. Accordingly, a user may readily and quickly generate a report with respect to a business unit's performance and provide intelligent and target recommendations for improvement of the business unit's performance.

For the purposes of describing and defining the present disclosure, it is noted that reference herein to a variable being a "function" of a parameter or another variable is not intended to denote that the variable is exclusively a function of the listed parameter or variable. Rather, reference herein to a variable that is a "function" of a listed parameter is intended to be open ended such that the variable may be a function of a single parameter or a plurality of parameters.

It is also noted that recitations herein of "at least one" component, element, etc., should not be used to create an inference that the alternative use of the articles "a" or "an" should be limited to a single component, element, etc.

It is noted that recitations herein of a component of the present disclosure being "configured" or "programmed" in a particular way, to embody a particular property, or to function in a particular manner, are structural recitations, as opposed to recitations of intended use.

It is noted that terms like "preferably," "commonly," and "typically," when utilized herein, are not utilized to limit the scope of the claimed disclosure or to imply that certain features are critical, essential, or even important to the structure or function of the claimed disclosure. Rather, these terms are merely intended to identify particular aspects of an embodiment of the present disclosure or to emphasize alternative or additional features that may or may not be utilized in a particular embodiment of the present disclosure.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

It is noted that one or more of the following claims utilize the term "wherein" as a transitional phrase. For the purposes of defining the present disclosure, it is noted that this term is an open-ended transitional term that is used to introduce a recitation of a series of characteristics of the structure and should be interpreted in like manner as the more commonly used open-ended preamble term "comprising."

Having described the subject matter of the present disclosure in detail and by reference to specific embodiments thereof, it is noted that the various details disclosed herein should not be taken to imply that these details relate to elements that are essential components of the various embodiments described herein, even in cases where a particular element is illustrated in each of the drawings that accompany the present description 402. Further, it will be apparent that modifications and variations are possible without departing from the scope of the present disclosure, including, but not limited to, embodiments defined in the appended claims. More specifically, although some aspects of the present disclosure are identified herein as preferred or particularly advantageous, it is contemplated that the present disclosure is not necessarily limited to these aspects.

ASPECTS LISTING

Aspect 1. An intelligent scoring system for scoring a level of performance of a business unit of a plurality of business units in an organization, comprising: a scorecard tool comprising a scorecard and a neural network model; one or more user input devices; one or more memory components; one or more processors communicatively coupled to the scorecard tool, the one or more user input devices, and the one or more memory components; and machine-readable instructions stored in the one or more memory components that cause the intelligent scoring system to perform at least the following when executed by the one or more processors: receive from the one or more user input devices a parameter rating for the scorecard of the business unit for each of a first portion of a plurality of business performance parameters; automatically input the parameter rating for the scorecard of the business unit for each of a second portion of the plurality of business performance parameters; associate a weighting with each parameter rating; automatically estimate, via the neural network model, a parameter outcome score for each of the first portion and the second portion of the plurality of business performance parameters based on each respective parameter rating and each associated weighting; automatically estimate, via the neural network model, an overall outcome score indicating the level of performance of the business unit of the plurality of business units of the organization based on each parameter outcome score; and automatically generate one or more recommendations for improving the level of performance of the business unit based on the overall outcome score.

Aspect 2. The intelligent scoring system of any preceding aspect, wherein: the machine-readable instructions stored in the one or more memory components further cause the intelligent scoring system to generate one or more micro-organizational scores, and the one or more recommendations for improving the level of performance of the business unit comprises a recommendation to at least one micro-organizational entity.

Aspect 3. The intelligent scoring system of any preceding aspect, wherein: the machine-readable instructions stored in the one or more memory components further cause the intelligent scoring system to retrieve business data stored on the one or more memory components, the parameter rating for the scorecard of the business unit for each of the second portion of the plurality of business performance parameters is generated, via the neural network model, based on the business data.

Aspect 4. The intelligent scoring system of any preceding aspect, wherein the machine-readable instructions stored in the one or more memory components further cause the intelligent scoring system to automatically generate, via the neural network model, the parameter rating for each of the second portion of the plurality of business performance parameters based on the rating parameter received from the one or more user input devices and the business data.

Aspect 5. The intelligent scoring system of any preceding aspect, further comprising a display communicatively coupled to the one or more processors, wherein the machine-readable instructions stored in the one or more memory components further cause the intelligent scoring system to display the one or more recommendations for improving the level of performance of the business unit on the display.

Aspect 6. The intelligent scoring system of any preceding aspect, wherein the plurality of business performance parameters include value to core business, leadership, delivery responsibility, ownership, participation, responsibility, footprint, collaboration, employee band mix, number of subordinates, employee survey inputs, retention, process maturity/adoption, tool usage, or innovation culture.

Aspect 7. A method for intelligent assessment of a business unit of a plurality of business units of an organization, the method comprising: receiving with one or more processors of an intelligent scoring system, a parameter rating for a scorecard of the business unit for each of a first portion of a plurality of business performance parameters; automatically inputting the parameter rating for the scorecard of the business unit for each of a second portion of the plurality of business performance parameters; associating a weighting with each parameter rating; automatically estimating, via a neural network model, a parameter outcome score for each of the first portion and the second portion of the plurality of business performance parameters based on each respective parameter rating and each associated weighting; automatically estimating, via the neural network model, an overall outcome score indicating a level of performance of the business unit of the plurality of business units of the organization based on each parameter outcome score; and automatically generating one or more recommendations for improving the level of performance of the business unit based on the overall outcome score.

Aspect 8. The method of any preceding aspect, further comprising generating one or more micro-organizational scores, wherein the one or more recommendations for improving the level of performance of the business unit comprises a recommendation to at least one micro-organizational entity.

Aspect 9. The method of any preceding aspect, further comprising retrieving, with the one or more processors, business data stored on one or more memory components, wherein the parameter rating for the scorecard of the business unit for each of the second portion of the plurality of business performance parameters is generated, via the neural network model, based on the business data.

Aspect 10. The method of any preceding aspect, further comprising generating, via the neural network model, the parameter rating for each of the second portion of the plurality of business performance parameters based on a rating parameter received from one or more user input devices and the business data.

Aspect 11. The method of any preceding aspect, further comprising displaying, on a display communicatively coupled to the one or more processors, the one or more recommendations for improving the level of performance of the business unit.

Aspect 12. The method of any preceding aspect, wherein the plurality of business performance parameters include value to core business, leadership, delivery responsibility, ownership, participation, responsibility, footprint, collaboration, employee band mix, number of subordinates, employee survey inputs, retention, process maturity/adoption, tool usage, or innovation culture.

Aspect 13. The method of any preceding aspect, wherein the plurality of business performance parameters include at least two or more of value to core business, leadership, delivery responsibility, delivery responsibility, ownership, participation, responsibility, footprint, collaboration, employee band mix, number of subordinates, employee survey inputs, retention, process maturity/adoption, tool usage, or innovation culture.

Aspect 14. A method for intelligent assessment of a business unit of a plurality of business units of an organization, the method comprising: retrieving, with one or more processors, business data stored on one or more memory components communicatively coupled to the one or more processors; automatically generating, via a neural network model, a rating parameter for one or more business performance parameters based the business data; associating a weighting with each parameter rating; automatically estimating, via the neural network model, a parameter outcome score for each of the one or more business performance parameters based on each respective parameter rating and each associated weighting; and automatically estimating, via the neural network model, an overall outcome score indicating a level of performance of the business unit of the plurality of business units of the organization based on each parameter outcome score.

Aspect 15. The method of any preceding aspect, further comprising automatically generating, via a neural network recommendation model, one or more recommendations for improving the level of performance of the business unit.

Aspect 16. The method of any preceding aspect, further comprising generating one or more micro-organizational scores, wherein the one or more recommendations for improving the level of performance of the business unit comprises a recommendation to at least one micro-organizational entity.

Aspect 17. The method of any preceding aspect, further comprising displaying the one or more recommendations for improving the level of performance of the business unit on a display communicatively coupled to the one or more processors.

Aspect 18. The method of any preceding aspect, further comprising: automatically determining, via the neural network model, a weightage of each of the one or more business performance parameters; and adjusting the weightage, via the neural network model, of each of the one or more business performance parameters to the overall outcome score.

Aspect 19. The method of any preceding aspect, wherein the one or more recommendations for improving the level of performance of the business unit are based on the weightage of each of the one or more business performance parameters to the overall outcome score.

Aspect 20. The method of any preceding aspect, wherein the one or more business performance parameters include value to core business, leadership, delivery responsibility, ownership, participation, responsibility, footprint; collaboration, employee band mix, number of subordinates, employee survey inputs, retention, process maturity/adoption, tool usage, or innovation culture.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. An intelligent scoring system for scoring a level of performance of a business unit of a plurality of business units in an organization, comprising:
 a scorecard tool comprising a scorecard and a neural network model;
 one or more user input devices;
 one or more memory components;
 one or more processors communicatively coupled to the scorecard tool, the one or more user input devices, and the one or more memory components; and
 machine-readable instructions stored in the one or more memory components that cause the intelligent scoring system to perform at least the following when executed by the one or more processors:

receive from the one or more user input devices a parameter rating for the scorecard of the business unit for each of a first portion of a plurality of business performance parameters;

automatically input the parameter rating for the scorecard of the business unit for each of a second portion of the plurality of business performance parameters;

automatically determine, via the neural network model, a weighting associated with each parameter rating;

automatically estimate, via the neural network model, a parameter outcome score for each of the first portion and the second portion of the plurality of business performance parameters based on each respective parameter rating and each associated weighting;

automatically estimate, via the neural network model, an overall outcome score indicating the level of performance of the business unit of the plurality of business units of the organization based on each parameter outcome score;

automatically generate one or more recommendations for improving the level of performance of the business unit based on the overall outcome score;

automatically display one or more portions of the scorecard including the weighting applied to each parameter rating as an indicator of an impact of each parameter to the overall outcome score;

store, to a training data server, at least one of the parameter rating, the weighting, the parameter outcome score, the overall outcome score, and/or the one or more recommendations as a historical parameter rating, a historical weighting, a historical parameter outcome score, a historical overall outcome score, and/or a historical recommendation;

update the neural network model, wherein the neural network model is retrained with the historical parameter rating, the historical weighting, the historical parameter outcome score, the historical overall outcome score, and/or the historical recommendation;

adjust the weighting, via the neural network model, of each parameter rating; and generate one or more micro-organizational scores for one or more subgroups of the business unit, wherein the one or more recommendations for improving the level of performance of the business unit comprises a recommendation to at least one micro-organizational entity including a first sub group selected from the one or more subgroups and focused on a product or a geographic location.

2. The intelligent scoring system of claim 1, wherein:
the machine-readable instructions stored in the one or more memory components further cause the intelligent scoring system to retrieve business data stored on the one or more memory components,
the parameter rating for the scorecard of the business unit for each of the second portion of the plurality of business performance parameters is generated, via the neural network model, based on the business data.

3. The intelligent scoring system of claim 2, wherein the machine-readable instructions stored in the one or more memory components further cause the intelligent scoring system to automatically generate, via the neural network model, the parameter rating for each of the second portion of the plurality of business performance parameters based on a rating parameter received from the one or more user input devices and the business data.

4. The intelligent scoring system of claim 1, further comprising a display communicatively coupled to the one or more processors, wherein the machine-readable instructions stored in the one or more memory components further cause the intelligent scoring system to display the one or more recommendations for improving the level of performance of the business unit on the display.

5. The intelligent scoring system of claim 1, wherein the plurality of business performance parameters include value to core business, leadership, delivery responsibility, ownership, participation, responsibility, footprint, collaboration, employee band mix, number of subordinates, employee survey inputs, retention, process maturity/adoption, tool usage, or innovation culture.

6. A method for intelligent assessment of a business unit of a plurality of business units of an organization, the method comprising:

receiving with one or more processors of an intelligent scoring system, a parameter rating for a scorecard of the business unit for each of a first portion of a plurality of business performance parameters;

automatically inputting the parameter rating for the scorecard of the business unit for each of a second portion of the plurality of business performance parameters;

automatically determining, via a neural network model, a weighting associated with each parameter rating;

automatically estimating, via the neural network model, a parameter outcome score for each of the first portion and the second portion of the plurality of business performance parameters based on each respective parameter rating and each associated weighting;

automatically estimating, via the neural network model, an overall outcome score indicating a level of performance of the business unit of the plurality of business units of the organization based on each parameter outcome score;

automatically generating one or more recommendations for improving the level of performance of the business unit based on the overall outcome score;

automatically displaying one or more portions of the scorecard including the weighting applied to each parameter rating as an indicator of an impact of each parameter to the overall outcome score;

storing, to a training data server, at least one of the parameter rating, the weighting, the parameter outcome score, the overall outcome score, and/or the one or more recommendations as a historical parameter rating, a historical weighting, a historical parameter outcome score, a historical overall outcome score, and/or a historical recommendation;

updating the neural network model by retraining the neural network model with the historical parameter rating, the historical weighting, the historical parameter outcome score, the historical overall outcome score, and/or the historical recommendation;

adjusting the weighting, via the neural network model, of each parameter rating; and generating one or more micro-organizational scores for one or more subgroups of the business unit, wherein the one or more recommendations for improving the level of performance of the business unit comprises a recommendation to at least one micro-organizational entity including a first sub group selected from the one or more subgroups and focused on a product or a geographic location.

7. The method of claim 6, further comprising retrieving, with the one or more processors, business data stored on one or more memory components, wherein the parameter rating for the scorecard of the business unit for each of the second portion of the plurality of business performance parameters is generated, via the neural network model, based on the business data.

8. The method of claim 7, further comprising generating, via the neural network model, the parameter rating for each of the second portion of the plurality of business performance parameters based on a rating parameter received from one or more user input devices and the business data.

9. The method of claim 6, further comprising displaying, on a display communicatively coupled to the one or more processors, the one or more recommendations for improving the level of performance of the business unit.

10. The method of claim 6, wherein the plurality of business performance parameters include value to core business, leadership, delivery responsibility, ownership, participation, responsibility, footprint, collaboration, employee band mix, number of subordinates, employee survey inputs, retention, process maturity/adoption, tool usage, or innovation culture.

11. The method of claim 6, wherein the plurality of business performance parameters include at least two or more of value to core business, leadership, delivery responsibility, delivery responsibility, ownership, participation, responsibility, footprint, collaboration, employee band mix, number of subordinates, employee survey inputs, retention, process maturity/adoption, tool usage, or innovation culture.

12. A method for intelligent assessment of a business unit of a plurality of business units of an organization, the method comprising:
    retrieving, with one or more processors, business data stored on one or more memory components communicatively coupled to the one or more processors;
    automatically generating, via a neural network model, a rating parameter for one or more business performance parameters based the business data;
    automatically determining, via the neural network model, a weighting associated with each parameter rating;
    automatically estimating, via the neural network model, a parameter outcome score for each of the one or more business performance parameters based on each respective parameter rating and each associated weighting;
    automatically estimating, via the neural network model, an overall outcome score indicating a level of performance of the business unit of the plurality of business units of the organization based on each parameter outcome score;
    automatically displaying a scorecard including the rating parameter, the weighting applied to each parameter rating, the parameter outcome score and the overall outcome score as an indicator of an impact of each parameter to the overall outcome score;
    storing, to a training data server, at least one of the parameter rating, the weighting, the parameter outcome score, and/or the overall outcome score as a historical parameter rating, a historical weighting, a historical parameter outcome score, and/or a historical overall outcome score;
    updating the neural network model by retraining the neural network model with the historical parameter rating, the historical weighting, the historical parameter outcome score, and/or the historical overall outcome score;
    adjusting the weighting, via the neural network model, of each parameter rating;
    automatically generating, via a neural network recommendation model, one or more recommendations for improving the level of performance of the business unit; and
    generating one or more micro-organizational scores for one or more subgroups of the business unit, wherein the one or more recommendations for improving the level of performance of the business unit comprises a recommendation to at least one micro-organizational entity including a first sub group selected from the one or more subgroups and focused on a product or a geographic location.

13. The method of claim 12, further comprising displaying the one or more recommendations for improving the level of performance of the business unit on a display communicatively coupled to the one or more processors.

14. The method of claim 12, wherein the one or more recommendations for improving the level of performance of the business unit are based on the weightage of each of the one or more business performance parameters to the overall outcome score.

15. The method of claim 12, wherein the one or more business performance parameters include value to core business, leadership, delivery responsibility, ownership, participation, responsibility, footprint; collaboration, employee band mix, number of subordinates, employee survey inputs, retention, process maturity/adoption, tool usage, or innovation culture.

16. The intelligent scoring system of claim 1, wherein the business performance parameters are customized for the first sub-group of the business unit based on goals, needs, and organization structure, and includes one or more global capability parameters and one or more execution capability parameters.

* * * * *